United States Patent [19]
Mathews et al.

[11] Patent Number: 5,005,633
[45] Date of Patent: Apr. 9, 1991

[54] LENS BLOCKING APPARATUS

[75] Inventors: Herbert H. Mathews, Muskogee; Joseph L. Welch, Jenks, both of Okla.

[73] Assignee: Coburn Optical Industries, a Division of Pilkington Visioncare, Inc., Muskogee, Okla.

[21] Appl. No.: 447,844

[22] Filed: Dec. 8, 1989

[51] Int. Cl.[5] .............................................. B22D 19/00
[52] U.S. Cl. ............................. 164/334; 51/216 LP; 425/808; 269/7; 269/58
[58] Field of Search ............ 51/216 LP, 216 R, 162, 51/277; 164/332, 334; 269/7, 58; 425/808; 249/88; 264/1.7, 2.2, 2.7

[56] References Cited

U.S. PATENT DOCUMENTS

| | | | |
|---|---|---|---|
| 3,468,366 | 9/1969 | Suddarth | 164/332 |
| 3,866,667 | 2/1975 | Knight | 51/216 LP |
| 3,946,982 | 3/1976 | Culkins et al. | 425/808 |
| 3,951,203 | 4/1976 | Prunier | 164/334 |

FOREIGN PATENT DOCUMENTS

2017546 10/1979 United Kingdom ........... 51/216 LP

Primary Examiner—Roscoe V. Parker
Attorney, Agent, or Firm—Burns, Doane, Swecker & Mathis

[57] ABSTRACT

A blocking mechanism comprises a similified rotary dial mechanism and a lens clamp which automatically depressurizes a molten alloy tank in response to a release of the lens clamp pressure. A lens seat is provided with a raised resilient pad to accommodate the recessed portion of a bifocal lens. The application of final lens clamping pressure cannot occur until the lens clamp contacts the lens in order to assure that an operator's finger cannot become accidentally pinched.

14 Claims, 6 Drawing Sheets

LENS BLOCKING APPARATUS

BACKGROUND OF THE INVENTION

The present invention relates to the blocking of an ophthalmic lens blank preparatory to a lens grinding operation and, in particular to a lens blocking machine which adheres a lens to a block insert by means of a low temperature alloy.

The manufacture of ophthalmic lenses involves the placement of a finished surface on one of the major faces of a lens blank, and the grinding of a prescription surface on the other major face thereof. Usually the finished surface is convex and is formed during the fabrication of the lens blank. The prescription surface is usually concave and ground in the field. The prescription surface is ground about an axis, termed a cylinder axis, disposed in a particular orientation relative to a reference axis of the lens blank.

The radius of the prescription surface is set at a required length to correct for the amount of myopia or hyperopia. In certain instances, such as if astigmatism is to be corrected, the cylinder axis is angularly offset relative to the reference axis of the lens to create a toric lens configuration.

Grinding is carried out in a grinding machine which comprises a lens holder and a grinding tool. Typically, the grinding step is carried out by passing the grinding tool across a face of a stationarily-held lens. The lens is temporarily affixed to a block which is installed in a fixed location in the holder.

It is necessary that the optic center of the finished lens be properly oriented relative to the patient's pupil position. A relatively inexpensive way of achieving this has been to form a prism in the lens. This is achieved by adjusting the position of the lens relative to the grinding tool to define a proper prism angle and axis. Since the block to which the lens is affixed is installed in a fixed location in the holder, it is necessary to set the proper prism angle axis when affixing the lens to the block. The lens is typically affixed to the block by means of a lens blocking mechanism comprising a wedge-shaped dial arrangement which positions the lens at a variable inclination relative to the block. By rotating the dial arrangement and clamping the lens to the dial arrangement, the lens can be selectively inclined relative to the block. Then, a molten metal alloy is fed from a pressurized tank into a cavity formed by the lens, the dial and the block. Upon hardening, the metal adheres to the lens and block to form a releasable bond therebetween.

It would be desirable to improve and simplify the operation and performance of the dials in order to enable the prism angle to be set more rapidly and accurately.

It would also be desirable to improve the safety of operation of the blocking machine. In that regard, the lens is secured to a seat of the dial mechanism by being pushed firmly thereagainst by a pneumatic clamp. It may occur, however, that the operator's finger may accidentally become pinched between the clamp and the lens whereby an injury may occur. Another problem involves the possibility that upon a release of the clamp, molten alloy under residual pressure in the alloy tank may spurt out past the unclamped lens.

Another shortcoming relating to conventional lens blocking equipment involves the blocking of so-called progressive lenses which contain a recessed bifocal section. The presence of such a recessed section makes it difficult to create a proper seal between the lens and the lens seating surface. In the past, this problem has been dealt with by cramming putty into the gap created by the recessed section. However, this procedure is difficult and messy and requires that a supply of putty be kept on hand.

SUMMARY OF THE INVENTION

The present invention relates to a lens blocking apparatus comprising a base which removably receives a block insert. An axis ring is mounted on the base for rotation about a first axis. The axis ring has an axis scale graduated over 360 degrees. A lower prism ring is mounted on the base for rotation about the first axis and includes a support surface defining a second axis which is inclined by a first acute angle relative to the first axis. The lower prism ring has a first prism scale graduated exponentially from zero to six diopters over a ninety degree region. An upper prism ring is mounted on the support surface of the first prism ring for rotation about the second axis. The upper prism ring carries a lens seat defining a third axis which is inclined by a second angle relative to the first axis. The second axis is equal to two times the first angle. The upper prism ring includes a second prism scale graduated exponentially from zero to six diopters over a one hundred eighty degree region of the upper prism ring. The lens seat is arranged to define the upper edge of a space disposed between the seat and the block insert. A mechanism is provided for conducting a molten alloy to the space for adherence to the lens and block insert.

Preferably, the lens seat comprises a portion of an adjustable ring mounted on the upper prism ring for rotation about the third axis. The adjustable ring is releasably securable in selected positions of adjustment. A raised resilient pad extends around a portion of the lens seat for engaging and sealing against a recessed portion of a lens.

Preferably, a clamping mechanism is provided for clamping the lens against the lens seat. The clamping mechanism includes a clamping arm and a soft tip mounted on the clamping arm for engaging the lens. The tip is adjustably displaceable relative to the clamp arm for contacting the lens at selected locations to ensure that sufficient clamping is exerted in the vicinity of the resilient pad.

Preferably, a tank is provided which contains a molten alloy and communicates with the space for receiving the alloy. The interior of the tank is pressurizable for forcing molten alloy into the space. A relief valve is provided for relieving pressure in the tank. The clamp includes a clamp arm and is movable between a clamping position in which the clamp arm presses the lens against the lens seat, and a non-clamping position in which the clamp arm releases the lens. The clamping arm is operatively connected to the relief valve for closing the relief valve in response to clamping mechanism being shifted toward its clamping position so as to enable the tank to be pressurized. The relief valve is opened in response to a release of clamping pressure on the lens in order to depressurize the tank.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
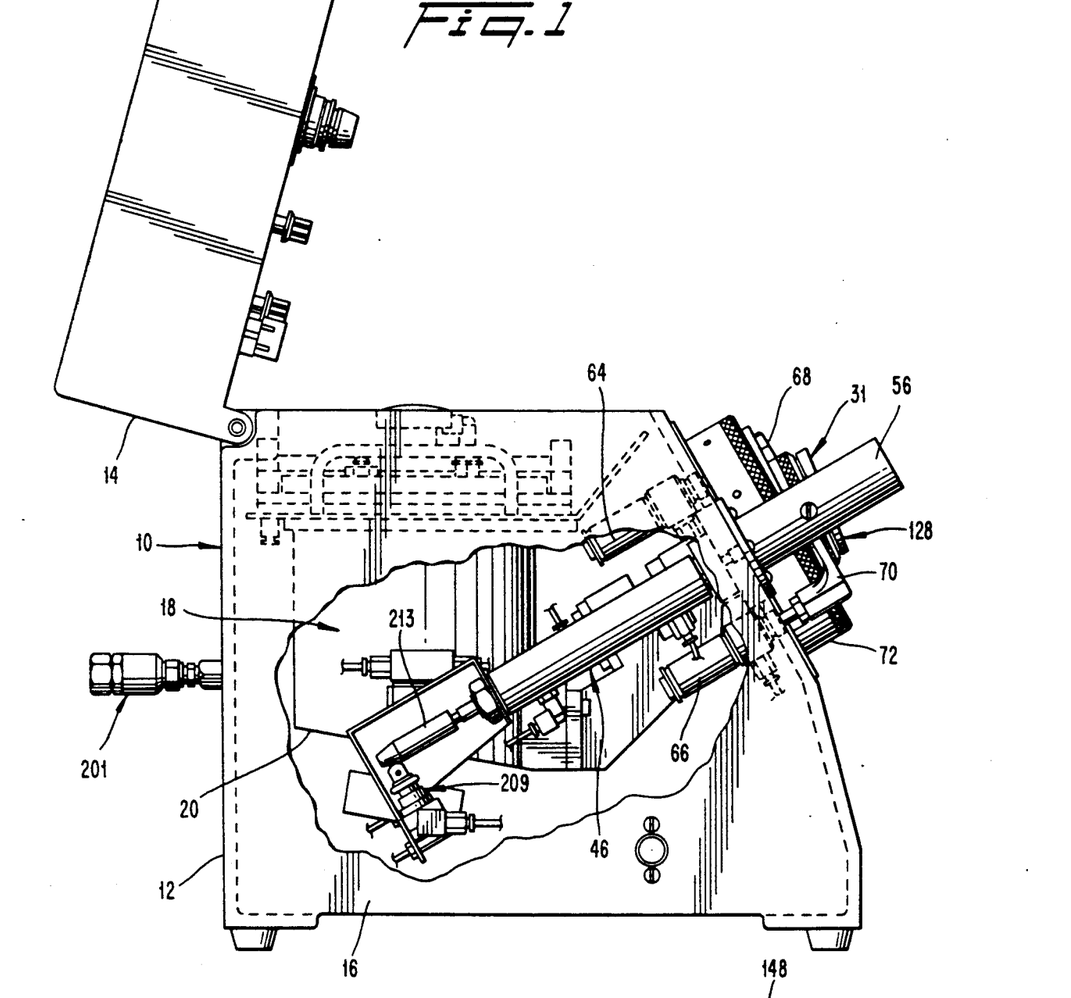
FIG. 1 is a side elevational view of a lens blocking apparatus according to the present invention, with a portion of a side wall thereof broken away.
Figure 3:
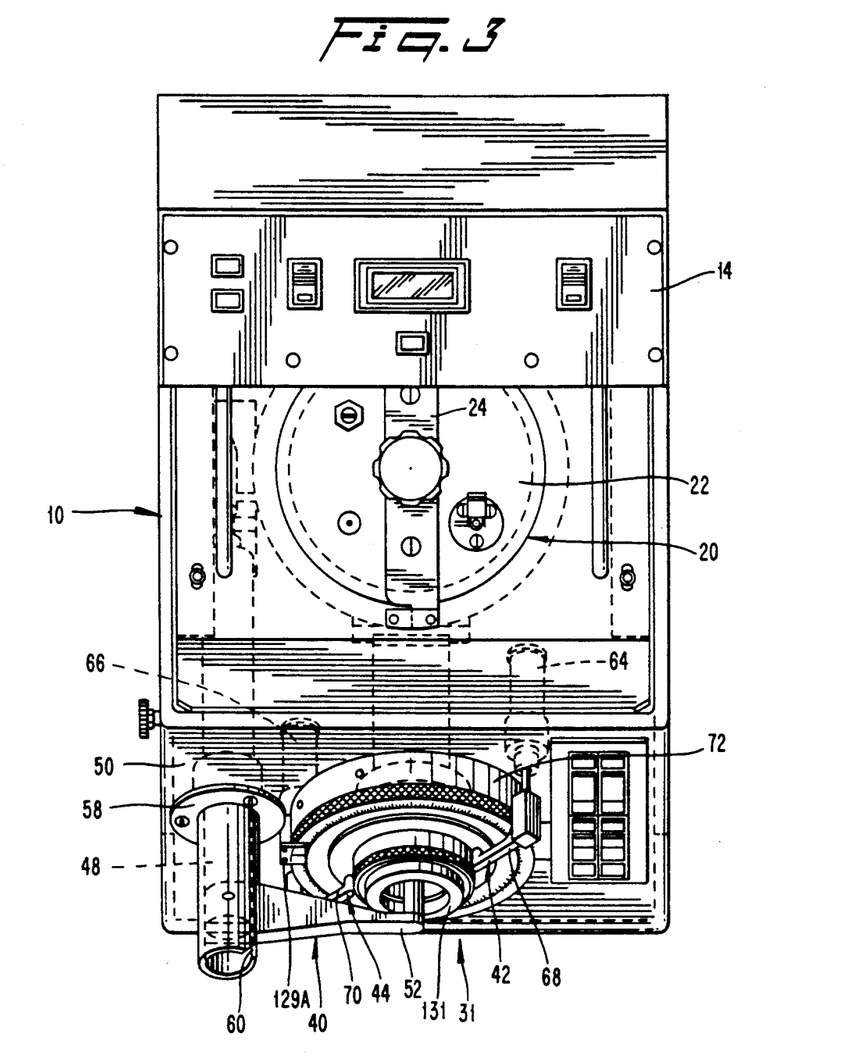
FIG. 3 is a top plan view of the lens blocking mechanism depicted in FIG. 1.

Depicted in FIG. 1 is a lens blocking apparatus 10 according to the present invention. The blocking apparatus 10 comprises a base 12 and a cover 14 hinged to the base. The base comprises an outer casing 16 which is open at the top, the top being closable by means of the hinged cover 14. Disposed within the base is a sealed pot or tank 18 adapted to contain a low temperature metal alloy which is heated to a temperature rendering the alloy flowable (see FIGS. 1 and 3 and a schematic showing in FIG. 8). The tank includes a body 20, a lid 22 which is removably clamped to the tank by a suitable clamp bracket, and an alloy-discharging stem 26 (see FIG. 8) extending upwardly from a lower end of a chamber 28 formed by the tank. The stem 26 communicates with a conduit 30 leading to a block cavity formed by a ring assembly 31 and thus supplies alloy to the block cavity as will be discussed hereinafter.

Figure 8:
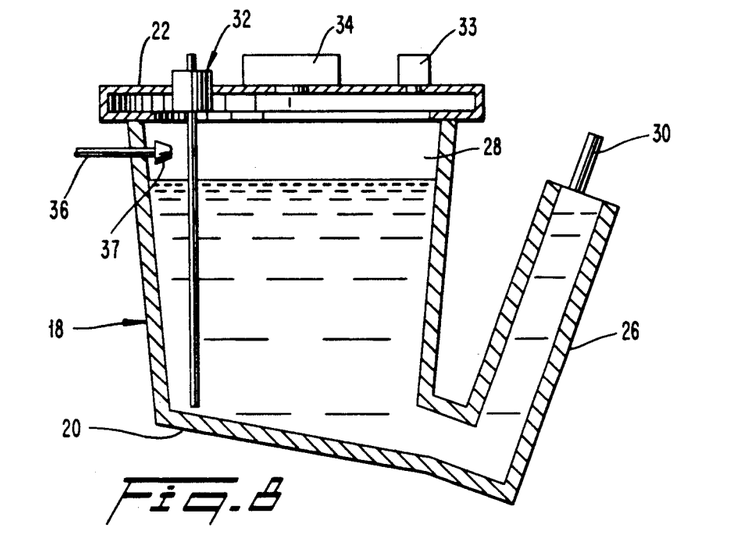
FIG. 8 is a cross-sectional view taken through an alloy tank according to the present invention.

The tank 18 contains an alloy level sensor 32 and a pressure-sensitive safety valve 33 mounted in the lid, which sensor and valve can be of conventional design. The valve 33 prevents over-pressurization of the tank. Also provided is a pressure release valve 34 the operation of which will be explained hereinafter.

A pressurized air inlet 36 extends into the tank so as to communicate with the upper end of the tank chamber 28. The air inlet is connected to a supply of pressurized air for introducing pressurized air into the chamber 28 (as will be later discussed) so as to forcibly discharge alloy through the stem 26 and conduit 30. A rubber one-way check valve 37 at the inner end of the inlet 36 prevents molten alloy from entering and clogging the inlet 36.

Figure 2:
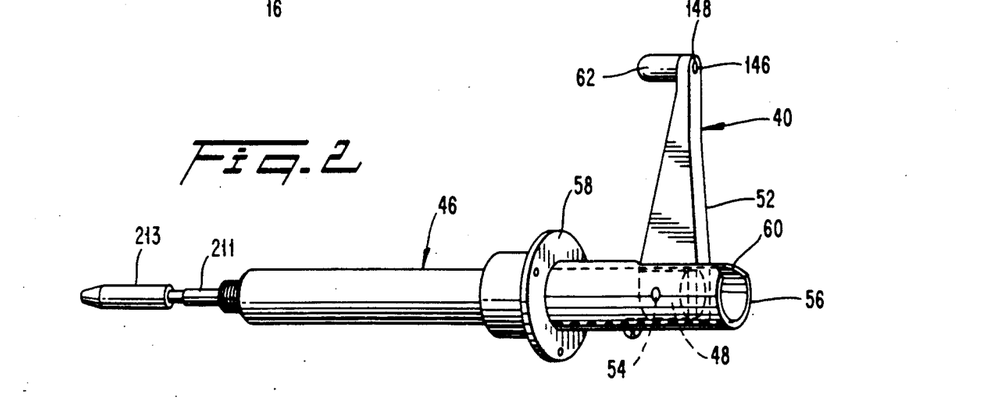
FIG. 2 is a side elevational view of a clamping mechanism according to the present invention.

A plurality of clamping assemblies are carried by the base, including a lens-clamping assembly 40, and ring-clamping assemblies 42, 44. The lens clamping assembly 40 comprises an air cylinder 46 mounted in the base 12 and arranged to be actuated by the air pump. The air cylinder 46 operates to reciprocate a clamp shaft 48 in the form of a piston rod attached to a piston of the air cylinder. One end of the clamp shaft extends forwardly from the cylinder through a front wall 50 of the base. Pivotably mounted on a forward end of the clamp shaft is a clamp arm 52 which is swingable about a horizontal pivot pin 54 connected with the piston rod 48. The clamp shaft is slidable within a tube 56 fixed to the front wall 50 by means of a flange 58. The tube contains a slot 60 enabling the clamp arm 52 to be swung between an upward non-clamping position (not shown) and a lower clamping position (shown in FIGS. 2 and 3). In the clamping position, a clamping end 62 of the clamp arm is disposed to overlie a lens situated on the ring assembly 31. When the clamp shaft is in a retracted condition, the clamp arm 52 will firmly press the lens against the ring assembly.

Each of the ring-clamping assemblies 42, 44 comprises an air cylinder 64, 66 mounted in the base (see FIG. 1), and clamp arms 68, 70 carried by respective ones of the air cylinders for extension and retraction between non-clamping and clamping positions, respectively. By actuating the air cylinders, the clamp arms retract to immobilize upper and lower prism rings of the ring assembly 31, as will be hereinafter explained.

The ring assembly 31, which is mounted on the front wall of the base, comprises a support member 72, a rotary axis ring 74, a lower rotary prism ring 76, and an upper rotary prism ring 78. The support member 72 includes an internal coolant passage 80 communicating with a suitable source of cooling medium such as water. Extending through the coolant ring are two through-holes 82, 84 adapted to slidably receive a pair of alignment pins 83 (see FIG. 10). Those pins are connected to an air cylinder 85 so as to be reciprocable within the through-holes 82, 84 for reasons to be explained.

Figure 6:
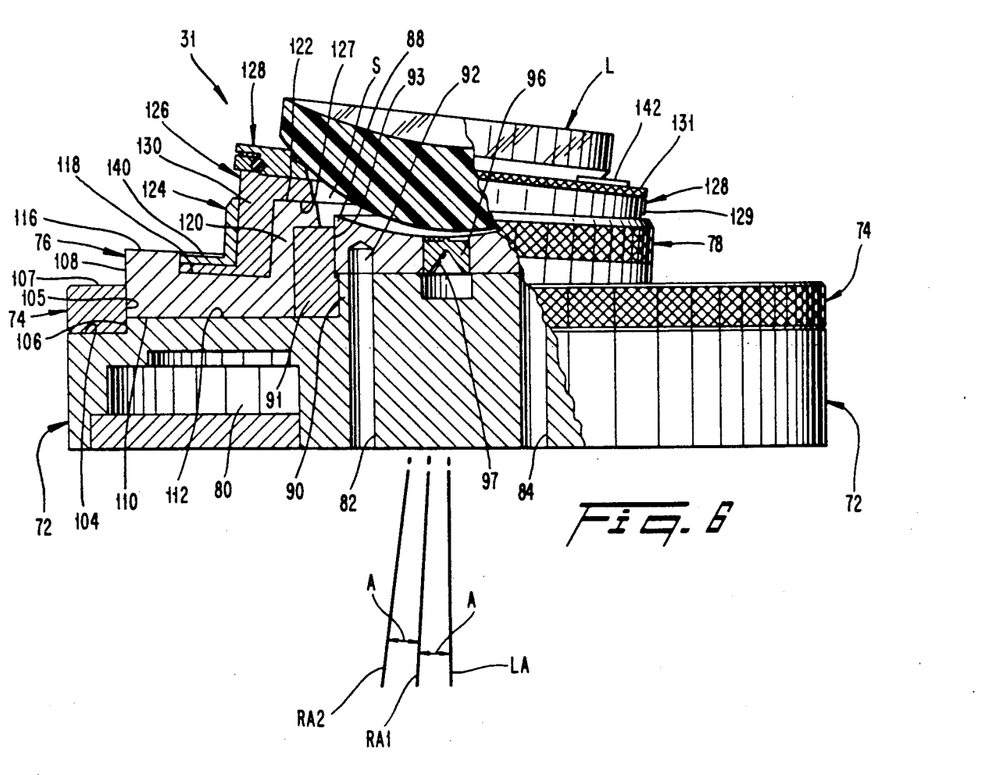
FIG. 6 is a side elevational view, partially broken away, of a lens adjusting dial mechanism according to the present invention.
Figure 7:
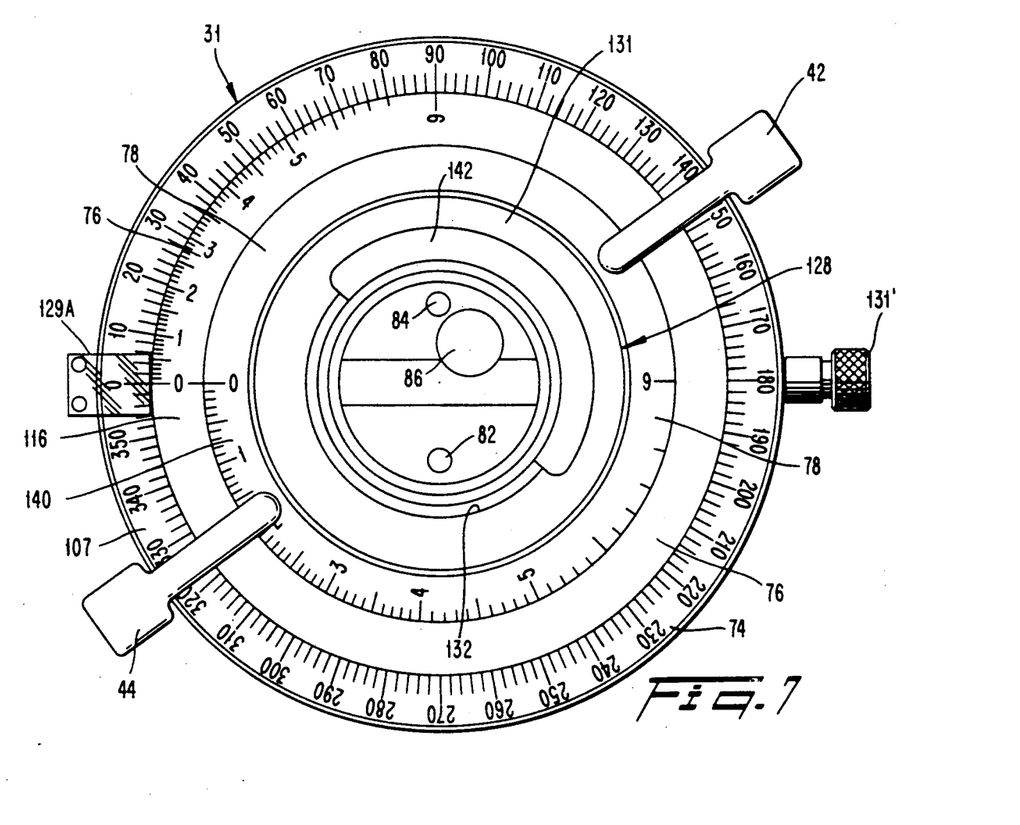
FIG. 7 is a top plan view of the dial mechanism in a neutral position.

Also extending through the support plate is an alloy conduit 86 (see FIG. 7) which communicates with the conduit 30 leading from the alloy tank stem for conducting alloy into a CAVITY S situated between a block insert 88 and a lens L (see FIG. 6).

The support member 72 includes an upstanding, cylindrical inner pedestal portion 90 and a hollow cylinder 91 press-fit to a predial in order to define a cylindrical chamber 93 adapted to receive the block insert 88 such that the block insert 88 overlies the through-holes 82, 84. The alignment and ejection pins can be projected beyond the through-holes 82, 84 in order to fit within a pair of guide apertures 92 of the block insert (only one guide aperture 92 being depicted). The forward ends of the pins thus immobilize the block insert 88 against rotation about a longitudinal axis LA of the ring assembly. The block insert 88, which is conventional, includes three aligned holes in which are disposed three cylindrical plugs 94, 96, 98 having pointed tips 100 at their front ends. The tips are aligned to define a predetermined reference axis RA as will be explained hereinafter.

A central one of the tips 100, i.e., the tip 100 of the center plug 96, is aligned with the longitudinal axis LA of the ring assembly. Rear ends of the plugs contain conical recesses 97 (FIG. 6) enable the block insert 88 to be inserted in the lens holder with the reference axis RA of the block insert always oriented in the same predetermined direction. The block insert also includes a through-hole 102 which becomes aligned with the alloy conduit 86 of the support member 72 when the block insert 88 is inserted into the chamber 93.

The axis ring 74 is mounted on an upper surface 104 of the support member 72 such that an inner circumferential surface 105 thereof rotates about an annular wall 106 of an outer cylindrical pedestal of the support member 72, that wall 106 being coaxial with the longitudinal axis LA. The axis ring 74, which carries a 360° scale on its upper surface 107, is thus rotatable relative to the support member 72 about the longitudinal axis LA.

The lower prism ring 76 includes an outer circumferential surface 108 which slides within the inner circumferential surface 105 of the axis ring, and a bottom surface 110 which rests slidably upon a surface 112 of the outer pedestal of the support member 72. The shelf and bottom surfaces are oriented perpendicular to the longitudinal axis LA.

The lower prism ring 76 also includes a stepped upper surface comprised of a dial surface portion 116 and a guide surface portion 118 which is stepped downwardly and radially inwardly from the dial surface portion. Both the dial surface portion and guide surface portion lie in planes which are mutually parallel and define a first ring axis RA1 inclined at an acute angle A relative to the axis LA. The lower prism ring 76 further includes an upstanding cylindrical pedestal 120 at the inner circumference of the guide portion 118. A top surface 122 of that pedestal 120 lies in a plane oriented parallel to that of the guide surface portion 118. The lower prism ring is thus rotatable relative to the support member 72 and the axis ring 74 about the longitudinal axis LA. The dial surface portion 116 carries a prism scale graduated exponentially from 0 to 6 diopters over a 90° region.

The upper prism ring 78 includes a scale portion 124, a support portion 126, and a segment positioning portion 128. The scale portion 124 and the support portion 126 are fixedly together, e.g., by screws, for common rotation. The segment positioning portion 128 is intended to be secured by four screws 129 to the support portion 126 for common rotation therewith during a lens orienting procedure, but is able to be rotatably adjusted relative thereto for reasons to be explained later herein. The support portion 126 includes a lower surface 127 which rides upon the guide surface portion 122 of the lower prism ring 76. The support portion 126 includes a cylindrical pedestal 130 which telescopingly receives the pedestal 120 of the lower prism ring 76. The segment positioning portion 128 includes an upper surface 131 containing a center recess which defines a circular edge or lens seat 132. That upper surface 131 is inclined relative to the lower surface 127 of the support portion 126, whereby the lens seat 132 defines a second ring axis RA2 inclined relative to the first ring axis RA1 by an angle equal to the afore-mentioned angle A. Thus, it is possible to rotate the upper prism ring 78 about the first ring axis RA1 to displace the axis RA2 of the lens seat between two extreme positions; in on extreme position, the second ring axis RA2 forms an angle 2A relative to the longitudinal axis LA (i.e., a maximum prism angle—FIG. 6) and in the other extreme position wherein the second ring axis RA2 coincides with the longitudinal axis LA (i.e., zero prism angle).

The scale portion 124 includes an upwardly facing surface 140 which carries a second prism scale graduated exponentially from 0 to 6 diopters over a 180° region. When the zero marks of the first and second prism scales are aligned, the axis RA2 of the lens seat 132 will be aligned with the longitudinal axis LA (i.e., the prism angle of the lens equals zero).

Figure 4:
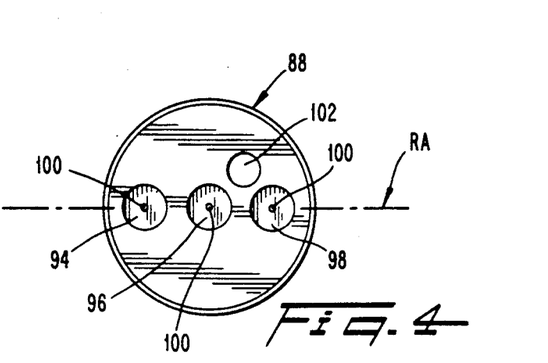
FIG. 4 is a top plan view of a block insert which is usable in connection with the present invention.

In practice, when a lens L is seated on the seating edge 132, a reference line pre-marked on the lens is brought into alignment with the reference axis RA defined by the three pointed tips of the plugs 94, 96, 98 (see FIG. 4) carried by the block insert 88. The operator aligns the optical center with the center projection 100 on the block insert by viewing through a conventional scope (not shown). When the three scales, i.e., the axis scale of the axis ring 74 and the first and second prism rings of the lower and upper prism rings 76, 78 all have their zero marks aligned (see FIG. 7), an imaginary plane extending through all of those zero marks will be superimposed over the reference axis RA. Since the zero marks of the upper and lower prism rings are aligned, the second ring axis RA2 will be aligned with the longitudinal axis LA, whereby the lens seat 132 will be oriented perpendicular to the longitudinal axis LA. This setting of the dials represents a zero cylinder axis/zero prism axis setting. By then rotating the upper prism ring 78 relative to the lower prism ring 76, the second ring axis RA2 will become inclined relative to the longitudinal axis LA by a selected angle, the size of which depends upon the amount of rotation of the upper prism ring. That selected angle defines the amount of prism to be incorporated into the lens.

Figure 9:
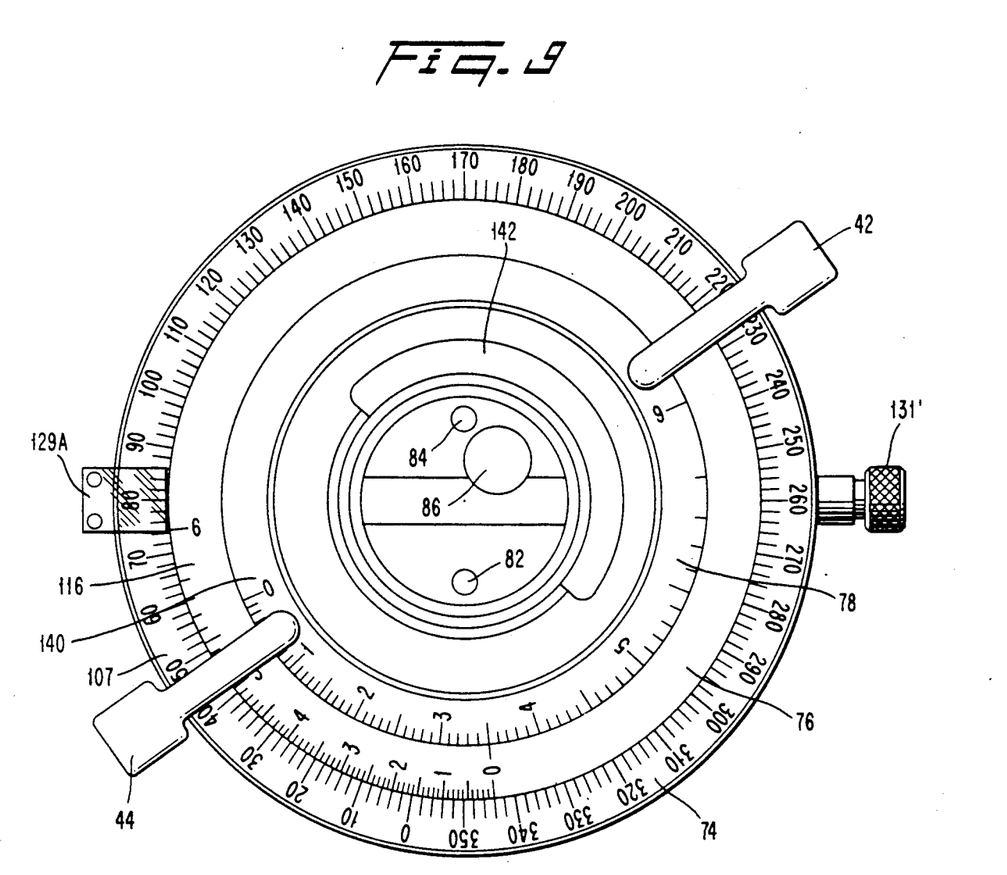
FIG. 9 is a top plan view of the dial mechanism in one exemplary position of adjustment.

For example, with reference to FIG. 9, if it is desired to set the lens for a cylinder axis of 80°, and a prism angle of 20° at 3.5 diopters, it is merely necessary to (a) rotate the axis ring 74 to bring mark 80 into alignment with a stationary indicator 129A (and securing the axis ring in that position by means of a set screw 131), (b) rotate the lower prism ring 76 until the 3.5 diopter mark thereof is aligned with the 20° mark on the axis ring 74, and then (c) rotate the upper prism ring 78 until the 3.5 diopter mark thereof is aligned with the zero mark of the lower prism ring 76. This simplicity is enabled by the fact that the second prism scale on the upper prism ring extends along a full 180° region.

Then, the clamps 40, 42, 44 are actuated to fix the lower and upper prism rings and to clamp the lens against the lens seat 132.

The upper surface 131 of the segment positioning portion may carry a pad 142 of resilient material such as plastic or rubber for example, which extends around the circumference of the positioning ring for 180° and is raised, i.e., arranged to project slightly upwardly beyond the lens seat 132. The segment positioning portion 128 can be rotated relative to the upper prism ring 78, thereby enabling the resilient pad 142 to be located at any desired location relative to the lens. This feature is advantageous in connection with the use of progressive types of bifocal lenses wherein a recessed bifocal section of the finished lens surface would not snugly engage the lens-seating surface 131 in the absence of the resilient pad 142. However, by suitably adjusting the positioning ring 128 so that the pad underlies the bifocal section of the lens finished surface, the bifocal section will snugly contact the pad so as to prevent the creation of air gaps between the lens and the lens-seating surface. As noted earlier herein, the presence of such air gaps could result in the leakage of molten alloy unless putty was pressed into the gaps.

If the resilient pad 142 is not needed, then the segment positioning portion 128 can be replaced by a different upper ring having no pad.

The actual pressing of the lens against the lens seat 132 is performed by the hold-down tip 62 which has a soft (e.g., nylon) lens-engaging surface for preventing the lens from being damaged. The hold-down tip includes a shank 146 which is held in a hole 148 of the clamp arm 52 due to the friction of an 0-ring (not shown) carried by the shank.

Figure 5:
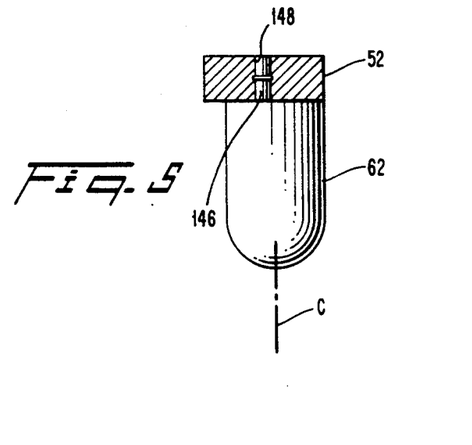
FIG. 5 is a cross-sectional view taken through an end of a clamp arm, depicting an alternative type of lens-engaging tip usable therewith.

Advantageously, the shank 146 could be offset relative to a center axis C of the tip, as depicted in FIG. 5. Consequently, by rotating the tip about the shank, it is possible to relocate the place of contact between the lens and the tip whereby such place of contact is disposed closely adjacent the resilient pad in order to ensure that sufficient pressure is applied to that part of the lens to create a seal with the pad.

Figure 10:
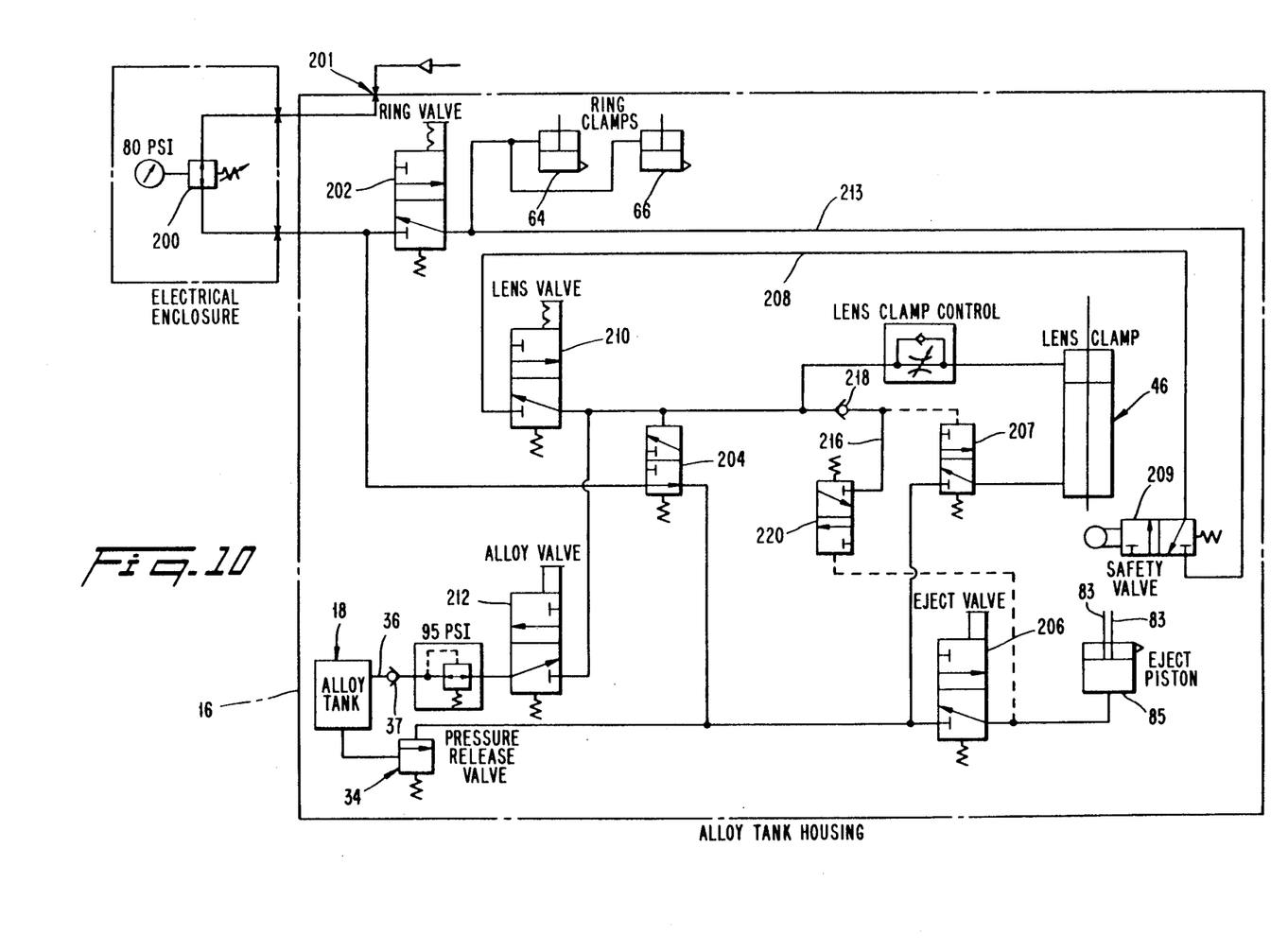
FIG. 10 is a pneumatic circuit of an air control system.

A fluid control circuit actuating the various mechanisms will now be described in connection with FIG. 10. This circuit is designed to provide a sequenced operation that will prevent the introduction of molten alloy or ejection of the blocked lens prematurely. The system also provides for two-handed operation of the lens clamping device as a safety precaution.

Initially, compressed air is introduced through a suitable connection 201 at the rear of the main housing 16. This air is then passed through a variable pressure regulator 200 which reduces the air pressure to 80 PSI. This air is then made available at a 2-position detented valve 202. The air also passes through a pilot operated valve 204 to the pressure release valve 34, an eject valve 206, and a pilot operated valve 207. Air pressure at the pressure release valve 34 opens that valve thereby preventing pressure build-up in the alloy tank 18 during heat-up. Air pressure at the eject valve 206 allows the operator to actuate the eject valve 206 to raise the alignment pins on the eject piston to facilitate loading of a block insert 88.

After the appropriate prism and axis settings have been made, the ring clamps are positioned and the ring valve 202 is activated. This provides air pressure to the cylinders 64, 66 to actuate the ring clamps and also provides air pressure at a cam operated safety valve 209. The actuation of the ring clamps prevents inadvertent movement of the prism and axis settings. The purpose of the safety valve is to require a two-handed manual positioning of the lens clamp, thus preventing pinching of the operator's hand or finger. That is, the operator positions the lens blank on the prism rings using the right hand and with the left hand the operator pushes the clamp arm 52 down until contact is made with the lens blank. A rod 211 attached to a lower side of the piston of the air cylinder 46 carries a cam 213 (see FIG. 2) which is arranged to engage and displace the safety valve 209 when the clamp arm 52 is pushed down. This displacement of the safety valve 209 serves to communicate a pressurized line 213 with a portion 208 of the circuit extending from the safety valve 209 to a 2-position detented lens valve 210.

Up to this point, the alloy valve 212 has not been supplied with compressed air. This avoids any risk of alloy being spilled as could occur if the valve 212 were actuated prior to the installation of the lens.

The lens valve 210 is then activated which accomplishes the following actions:

(1) the lens clamp cylinder 46 is actuated to hold the lens securely in place;
(2) the pilot operated valve 207 is actuated by air pressure, and a line 216 from a check valve 218 to a pilot operated valve 220 is pressurized; the check valve 218 maintains the pressure on this portion of the circuit until the valve 220 is signaled to open, whereby the valve 207 is kept in an open condition for subsequent repositioning of the lens clamp;
(3) the pilot operated valve 204 is actuated by air pressure to block the supply of compressed air and to depressurize the eject valve 206 and the pressure release valve 34; This action deactivates the eject valve is thus deactivated to prevent accidental disruption of the blocking process; the pressure release valve also closes, enabling the alloy tank 18 to be pressurized;
(4) pressurized air is supplied to the alloy valve 212 so that actuation of that valve 212 causes alloy to be injected into the space S; as this occurs, the eject valve remains disabled to prevent an accident should the wrong valve be actuated.

After the alloy has been injected and allowed to solidify, the lens valve 210 is deactivated. This action returns the pilot valve 204 to its normally open position, thus providing a compressed air supply to accomplish the following actions:

(1) the pressure release valve 34 is opened to vent the compressed air in the alloy tank to atmosphere;
(2) a supply of 80 PSI air is provided to the eject valve 206;
(3) the lens clamp cylinder 46 is actuated to raise the clamp arm 52 preparatory to ejecting the blocked lens.

Note that the pressurized air supply is removed from the alloy valve 212 to prevent accidental spillage of alloy for the remainder of the process. Note, also, that compressed air is maintained in the circuit between the check valve 218 and the pilot valves 207, 220. This maintains the pilot valve 207 in an open condition allowing the lens clamp to be raised.

The eject valve 206 is now activated to accomplish the following two actions:

(1) compressed air is provided to the eject piston 85 which ejects the blocked lens;
(2) a signal is sent to the pilot valve 220 which releases the air pressure trapped in the lines interconnecting the check valve 218 and the pilot valves 207, 220; this action subsequently closes the pilot valve 207 in order to depressurize the lens clamp and prepare the lens clamp for future operation.

In accordance with the present invention, a simplified dial arrangement is provided which facilitates a rapid and easy setting of the cylinder and prism angles. The dial arrangement is readily adapted for use with lenses having a recessed bifocal portion due to the presence of the raised resilient pad which extends around a portion of the lens seat. Adequate clamping forces in the vicinity of the raised pad can be provided for by means of the adjustability of the lens-engaging tip. Clamping of the lens cannot result in a pinching of an operator's finger since the pneumatic clamping force cannot be applied until after the lens clamp arm has engaged the lens. The squirting of molten metal past the lens after the clamping pressure has been released cannot occur, because the alloy tank pressure is relieved in response to the unclamping of the lens.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A lens blocking apparatus comprising:
a base including means for removably receiving a block insert, an axis ring mounted on said base for rotation about a first axis, said axis ring having a graduated axis scale, a lower prism ring mounted on said base for rotation about said first axis and including a support surface defining a second axis inclined by a first acute angle relative to said first axis, said lower prism ring having a first prism scale graduated exponentially from zero to six diopters over a ninety degree region of said lower prism ring, an upper prism ring mounted on said support surface of said lower prism ring for rotation about said second axis, said upper prism ring carrying a lens seat defining a third axis inclined by a second angle relative to said first axis, said second angle being equal to two times said first angle, said upper prism ring including a second prism scale graduated exponentially from zero to nine diopters over a one hundred eighty degree region of said upper prism ring, said lens seat arranged to define the upper edge of a space disposed between said seat and the block insert, and means for conducting a molten alloy to said space for adherence to the lens and block insert.

2. A lens blocking apparatus according to claim 1, wherein said lens seat comprises a portion of an adjustable ring mounted on said upper prism ring for rotation about said third axis, means releasably securing said adjustable ring in selected positions of adjustment, and a raised resilient pad extending around only a portion of said lens seat for engaging and sealing against a recessed portion of a lens.

3. A lens blocking apparatus according to claim 1 including clamping means for clamping the lens against said lens seat, said clamping means including a clamping arm and a soft tip mounted on said clamping arm for engaging the lens, said tip being adjustably displaceable relative to said clamp arm for contacting the lens at selected locations to ensure that sufficient clamping force is exerted in the vicinity of said resilient pad.

4. A lens blocking apparatus according to claim 1 including a tank containing a molten alloy and communicating with said space, means for pressurizing the interior of said tank for forcing molten alloy into said space, a pressure release valve for relieving pressure in said tank, clamping means for securing the lens against said seat, said clamping means including a clamp arm and being movable between a clamping position in which said clamp arm presses said lens against said lens seat, and a non-clamping position in which said clamp arm releases said lens, and means for closing said pressure release valve in response to said clamping means being shifted toward said clamping position to enable said tank to be pressurized, and for opening said relief valve in response to release of clamping pressure from said lens to depressurize said tank.

5. A lens blocking apparatus according to claim 4, wherein said means for opening and closing said relief valve means includes a cam connected to said clamping means for movement therewith.

6. A lens blocking apparatus for joining an ophthalmic lens blank to a block insert, comprising:

a lens seat for positioning said lens adjacent a block insert to form a confined space therebetween, clamp means for securing the lens against said lens seat, a tank containing therein a molten alloy and communicating with said space, means for pressurizing the interior of said tank for forcing molten alloy into said space, said molten alloy hardening in adherence with both said lens and said block insert, relief valve means for relieving pressure in said tank, clamping means including a clamp arm, said clamping means being movable between a clamping position in which said clamp arm presses said lens against said lens seat, and a non-clamping position in which said clamp arm releases said lens, and means for closing said relief valve means in response to said clamping means being shifted toward its clamping position to enable said tank to be pressurized, and for opening said relief valve in response to release of clamping pressure from said lens to depressurize said tank.

7. A lens blocking apparatus according to claim 6, wherein said means for closing and opening said relief valve means includes a cam connected to said clamping means for movement therewith.

8. A lens blocking apparatus according to claim 6, wherein said means for pressurizing said tank comprises a pneumatic pump connected to an air inlet conduit communicating with said tank, said air inlet conduit including a rubber one-way valve for resisting the entry of molten alloy into said air inlet conduit.

9. A lens blocking apparatus according to claim 6, wherein said lens seat means includes a raised resilient pad extending around only a portion thereof for sealing against a recessed portion of a lens.

10. A lens blocking apparatus according to claim 9, wherein said clamping arm carries a soft tip for engaging the lens, said tip being displaceable relative to said clamp arm to be located closer to said raised pad.

11. A lens blocking apparatus for joining an opthalic lens blank to a block insert, comprising a rotatable lens seat for positioning said lens adjacent a block insert to form therebetween a space adapted to receive a molten material which hardens in adherence with both to the lens and the block insert, and a raised resilient pad extending around only a portion of said lens seat for engaging and sealing against a recessed portion of the lens.

12. A lens blocking apparatus according to claim 11, wherein said pad extends for one hundred eighty degrees around said seat.

13. A lens blocking apparatus according to claim 11 including lens clamping means for clamping said lens against said lens seat, said clamping means including a clamp arm carrying a soft tip engageable with the lens, said tip being shiftable relative to said clamp arm to engage the lens at selected locations to ensure that sufficient clamping force is exerted in the vicinity of said resilient pad.

14. A lens blocking apparatus according to claim 13, wherein said tip includes a mounting portion rotatably adjustably disposed in said clamp arm and a lens engaging portion arranged eccentrically relative to said mounting portion.

* * * * *